United States Patent [19]

Nakamura et al.

[11] Patent Number: 4,802,094
[45] Date of Patent: Jan. 31, 1989

[54] PROCESS MONITORING APPARATUS FOR PROCESS MANAGEMENT IN PRODUCTION AND ASSEMBLY LINES

[75] Inventors: Masahiro Nakamura, Ibaragi; Tomohiro Murata, Ebina; Norihisa Komoda, Kawasaki; Kazuo Kera, Hitachi; Kenji Tsuchitani, Katauta; Kuniaki Matsumoto, Tokyo, all of Japan

[73] Assignee: Hitachi, Ltd., Tokyo, Japan

[21] Appl. No.: 879,568

[22] Filed: Jun. 27, 1986

[30] Foreign Application Priority Data

Jul. 10, 1985 [JP] Japan ................. 60-150197
Jul. 22, 1985 [JP] Japan ................. 60-161466

[51] Int. Cl.[4] ........................... G06F 15/46
[52] U.S. Cl. ..................... 364/468; 364/550; 364/478; 198/340; 198/349.7
[58] Field of Search .............. 364/550-552, 364/555, 468, 469, 472, 478, 479; 198/339.1, 340, 341; 414/134-136

[56] References Cited

U.S. PATENT DOCUMENTS

| 4,471,348 | 9/1984 | London et al. | 364/551 |
| 4,541,063 | 9/1985 | Doljack | 364/550 |
| 4,564,913 | 1/1986 | Yomogida et al. | 364/468 |
| 4,588,880 | 5/1986 | Hesser | 364/478 |
| 4,628,435 | 12/1986 | Tashiro et al. | 364/468 |
| 4,661,912 | 4/1987 | Imanishi | 364/468 |
| 4,683,540 | 7/1987 | Kurosu et al. | 364/468 |

Primary Examiner—Parshotam S. Lall
Assistant Examiner—Brian M. Mattson
Attorney, Agent, or Firm—Antonelli, Terry & Wands

[57] ABSTRACT

A method and an apparatus of removing works from each of the facilities in a production line is described in order to facilitate changing of a work monitoring operation in accordance with, for example, a layout change in the production line and a change in the facilities. Work tracking conditions are stored in a memory in the form of a table, and work tracking management data and plant status data which have been stored in the memory separately are retrived while the work tracking conditions are referred to, thereby extracting management data for which tracking conditions have been completed. The extracted management data is subjected to processing such as movement and updating in accordance with the contents of the above-described data which are referred to. In addition, in order to efficiently effect a process monitoring operation for each lot even when the arrangement of a lot consisting of a plurality of works joined together arbitrarily changes, such as, as a result of dividing the lot into a plurality of sub-lots, the arrangement of each lot is stored in the form of data of a tree structure, whereby the lot arrangement is readily changed by changing the tree structure.

7 Claims, 18 Drawing Sheets

FIG. 4

PLANT LAYOUT DEFINITION TABLE 10a

| ARROW NO. | INPUT ZONE NO. | OUTPUT ZONE NO. | CONDITION POINTER |
|---|---|---|---|
| 120 | — | 30 | |
| 121 | 31 | — | |
| 122 | 30 | 32 | |
| 123 | 32 | 31 | |
| 124 | 33 | 32 | |
| 125 | 32 | 34 | • |
| 126 | 35 | 32 | |
| 127 | 32 | 36 | • |

TRACKING CONDITION DEFINITION TABLE

| EXTERNAL SIGNAL CONDITION (1) | EXTERNAL SIGNAL CONDITION (2) | JUDGEMENT PROGRAM NO. | CONTROL PROGRAM NO. |
|---|---|---|---|
| (LOAD DETECTION SIGNAL c ON) ✳ (LOAD DETECTION SIGNAL a ON) | (LOAD DETECTION SIGNAL b OFF) | 1 | 5 |
| | | | |
| | | | |
| | | | |

FIG. 7

PLANT STATUS DATA TABLE (13)

| ARROW NO. | ARROW STATUS | EXECUTION MODE |
|---|---|---|
| 120 | 1 (ON) | 1 (EXECUTION WAIT) |
| 121 | 1 | 0 (EXECUTION COMPLETE) |
| 122 | 0 (OFF) | |
| 123 | 0 | |
| | | |

FIG. 8

PROGRAM EXECUTION MANAGEMENT TABLE (9)

| PROGRAM NO. | PROGRAM START ADDRESS | NUMBER OF PARAMETER | PARAMETER ADDRESS |
|---|---|---|---|
| 1 | EF000 | 3 | D000 |
| 2 | ? | ? | ? |
| | | | |
| | | | |

| TRACKING COMMAND | | | |
|---|---|---|---|
| COMMAND CODE | INPUT ZONE NO. | OUTPUT ZONE NO. | PARAMETERS |

FIG. 15

PLANT LAYOUT DEFINITION TABLE (10a)

| ARROW NO. | INPUT ZONE NO. | OUTPUT ZONE NO. | CONDITION POINTER |
|---|---|---|---|
| 100 | 111 | 114 | • |
| 101 | 112 | 114 | • |
| 102 | 113 | 114 | |
| 103 | 114 | 115 | |
| 104 | 114 | 116 | |
| | | | |

TRACKING CONDITION DEFINITION TABLE (10b)

| EXTERNAL SIGNAL CONDITION (1) | EXTERNAL SIGNAL CONDITION (2) | CONTROL PROGRAM ADDRESS |
|---|---|---|
| 105 OFF | 105 ON | EF 000 |
| 106 OFF | 106 ON | EF 100 |
| | | |
| | | |
| | | |

| ARROW NO. | LOT OPERATOR | OPERATION LOT NO. (1) | OPERATION LOT NO. (2) |
|---|---|---|---|
| 103 | DIVIDE | 1000 | 150 |
|  | JOIN | 1000 | 151 |
|  | DIVIDE | 1003 | 150 |
|  | JOIN | 1003 | 151 |
| 104 | DIVIDE | 1001 | 150 |
|  | JOIN | 1001 | 152 |
|  | DIVIDE | 1002 | 150 |
|  | JOIN | 1002 | 152 |

202

(a)

| LOT NO. | PARENT LOT (P) | CHILD LOT (C) | ELDER BROTHER LOT (EB) | LITTLE BROTHER LOT (LB) |
|---|---|---|---|---|
| 1000 | — | 1001 | — | — |
| 1001 | 1000 | 1002 | — | 1003 |
| 1002 | 1001 | — | — | — |
| 1003 | 1000 | — | 1001 | — |

(b)

(c)

PROCESS MONITORING APPARATUS FOR PROCESS MANAGEMENT IN PRODUCTION AND ASSEMBLY LINES

BACKGROUND OF THE INVENTION

The present invention relates to a process management in production and assembly lines. More particularly, the present invention pertains to a method of and apparatus for monitoring a process carried out along a line which branches and joins in a complicated manner such as that in the case where a plurality of parts or products (hereinafter referred to as "works") of various kinds are moved in a line while they are joined together, or a lot consisting of a plurality of joined works is divided into a plurality of sub-lots again.

To computerize a process monitoring operation, it is conventional practice to dispose sensors for detecting works moved in a production line and effect tracking of the works flowing in the production line in accordance with the contents of the information sent from the sensors, this tracking operation being programmed using a general-purpose computer language (see the specifications of Japanese Patent Laid-Open Nos. 35215/1981 and 129607/1983). FIG. 2 shows one example of the arrangement of a production line. A typical conventional process monitoring method will be explained below with reference to the illustrated production line.

A work (e.g., an automotive frame 1000) which is loaded on an input conveyor 30 so as to be subjected to processing is transported to an input line 36 by a carrier 32 and temporarily stored in a warehouse 38. Then, the work is transported to an input line 34 by the carrier 32, processed by process machines 37 and then transported through the input line 36 by the carrier 32 so as to be stored in the warehouse 38 again. The processed work is transported to an output conveyor 31 by the carrier 32 through an output line 35, and is then moved to a subsequent processing line by the output conveyor 31.

In such production line, the work (article) on the carrier 32 (zone 32) is tracked when moving to the input line 34 (zone 34) or the output line 35 (zone 35). A processing operation which is conducted when a load detection signal 45 for the input line 34 (zone 34) is turned ON is shown in FIG. 3. When an apparatus, (not shown) in which the above-described process monitoring transaction is computerized, detects that the load detection signal 45 is turned ON, a determination is made as to whether or not there is transaction work management data in a storage area provided in correspondence with each zone in the carrier 32 (zone 32) (Step 21). If YES, a judgement is made as to whether or not there is a space in the input line 34 (zone 34) (Step 22). If YES, a determination is made as to whether or not the destination of the top transaction in the carrier 32 (zone 32) is the input line 34 (zone 34) (Step 23). If YES, the top transaction in the zone 32 is transmitted to the zone 34 (Step 24). As will be clear from the flowchart shown in FIG. 3, the process monitoring execution program is prepared as a program for controlling the movement of the transaction in accordance with the load detection signal.

However, the conventional method, in which a program for controlling transaction is prepared and executed in accordance with the load detection signal as described above, has the following problems. Namely, the flow of transaction data is not directly expressed in the program, which means that, as the line arrangement becomes complicated, it is difficult to grasp the transaction data flow from the interrelationship between various control programs. As a consequence, when a program which has already been prepared is corrected or changed, much labor and time are needed to grasp the procedure which is to be changed.

SUMMARY OF THE INVENTION

It is a first object of the present invention to overcome the above-described problems of the prior art and provide a process monitoring apparatus which is suitable for carrying out collection of management data in work tracking operation, management and monitoring of operations in an automated production line and which facilitates programming and exhibits great flexibility.

It is a second object of the present invention to provide a method which enables tracking to be effective for each unit even in the case where the lot arrangement changes temporally due to the fact that one lot consists of a plurality of joined works or one lot is divided into a plurality of sub-lots.

To accomplish the first object, the present invention provides a process monitoring apparatus comprising: first memory means for holding characteristic data (hereinafter referred to as "facility data") for each of the facilities constituting a production line, the facility data including the data concerning the number of works which can reside in the facility and the data defining a manner of removing works from a respective facility; second memory means for holding work tracking condition data (hereinafter referred to as "process flow data") including data concerning a path along which the works move between facilities adjacent to each other; third memory means for holding management data (hereinafter referred to as "transaction definition data") for the works; fourth memory means for holding data for triggering a program which defines the tracking execution contents of management data given to the works (hereinafter referred to as "tracking program triggering data"); fifth memory means for holding plant status data including a detection signal of the movement of the works in the production line; means for extracting management data for which tracking conditions have been completed by retrieving information from the contents of the third and fifth memory means; and processing means for effecting processing operations such as movement, deletion, reference and updating on the extracted management data while referring to the first, second and fourth memory means.

To accomplish the second object, the present invention provides a process monitoring method which utilizes the nature of the lot arrangement tat it basically has a hierarchy structure in which one lot consists of a plurality of sub-lots, and each individual sub-lot consists of a plurality of sub-lots. More specifically, the feature of the present invention resides in that the hierarchy structure is managed as tree structure data, and this tree structure data is updated in accordance with the division of a lot or joining of sub-lots in the production line, thereby allowing a work group or a sub-lot group in a lot to be readily tracked in terms of lot even in the case where the lot arrangement changes arbitrarily.

BRIEF DESCRIPTION OF THE DRAWINGS

FIG. 4 shows one example of the arrangement of a table for storing process flow data;

FIG. 7 shows one example of the arrangement of a table for storing plant status data;

FIG. 8 shows one example of the arrangement of a table for storing tracking program triggering data;

FIG. 15 shows the arrangement of a table for storing process flow data;

DETAILED DESCRIPTION OF THE PREFERRED EMBODIMENTS

One embodiment of the present invention will be described hereinunder in detail with reference to the accompanying drawings.

The principle of the present invention will first be explained below.

In the present invention, data concerning the layout of facilities constituting a production line and the characteristics of each such facility, data for individually defining management data for an article (work) to be tracked, and data including a detection signal of movement of the work and data representing the conditions for executing the tracking in accordance with the management data are separated from each other and individually stored in a computer in the form of tables, and various operations are executed in accordance with the data stored in the tables. Thus, it becomes possible to directly grasp the relationship between the contents of the operation of tracking the work and the facility layout in the process monitoring operation.

Figure 2:
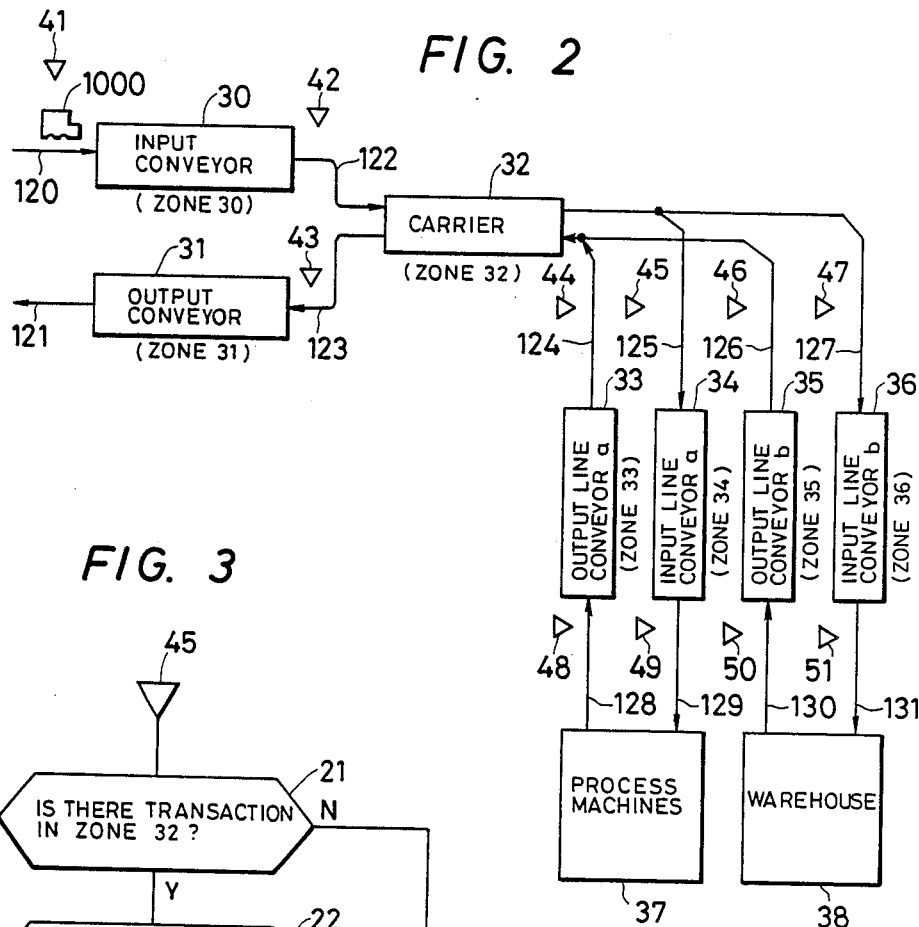
FIG. 2 shows one example of the arrangement of a production line.
Figure 3:
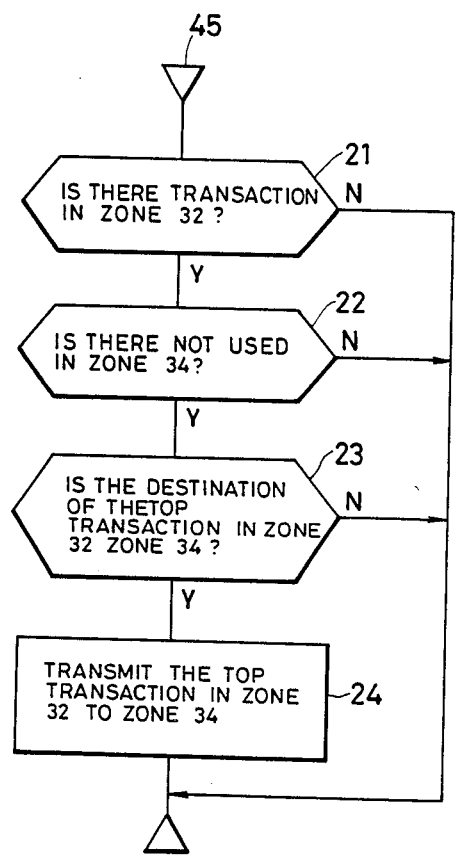
FIG. 3 is a flowchart showing a conventional process monitoring operation.

A production line which is an object of the process monitoring operation in the embodiment has an arrangement similar to that of the production line shown in FIG. 2. Therefore, the description of the production line in this embodiment will be made with reference to FIG. 2.

Figure 1:
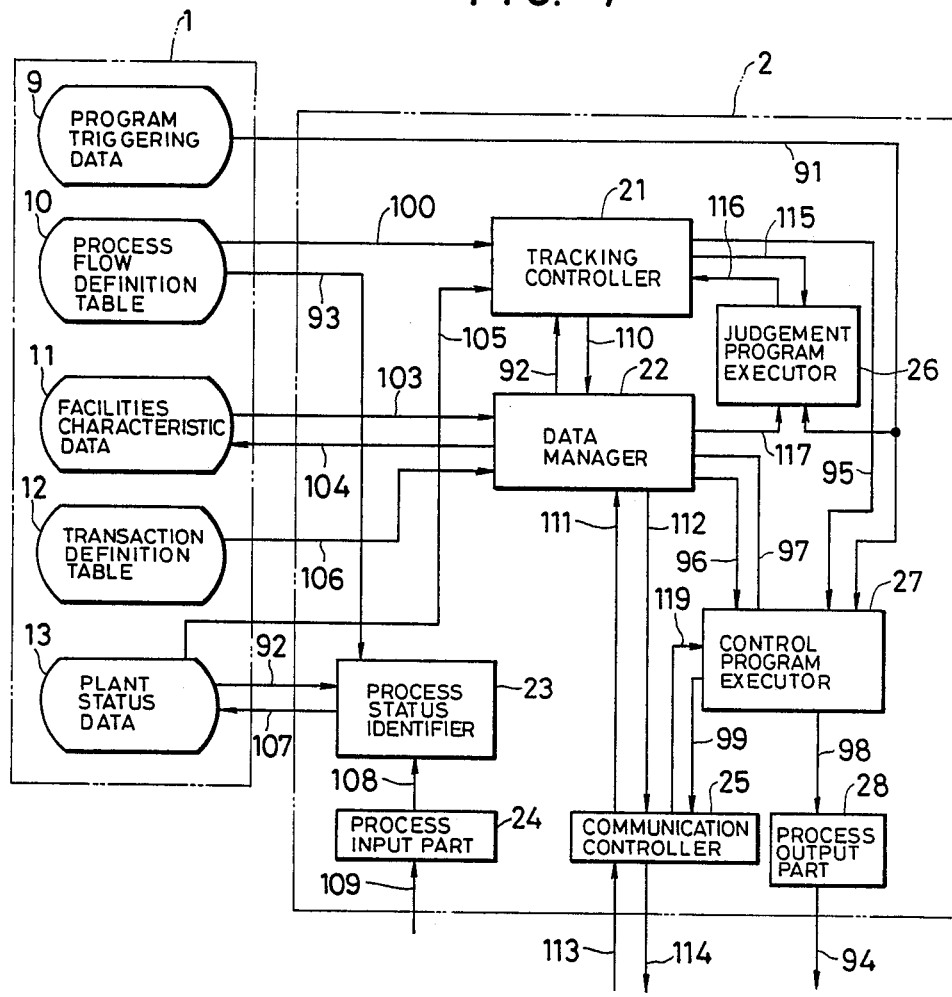
FIG. 1 shows the arrangement of a first embodiment of the process monitoring apparatus according to the present invention.

FIG. 1 shows the arrangement of a process monitoring apparatus in accordance with one embodiment of the present invention. The illustrated apparatus is arranged so as to monitor processing steps in the production line shown in FIG. 2.

The process monitoring apparatus according to the present invention consists of a process data storage memory 1 for storing various process data and the like and a process monitoring control section 2 for effecting a process monitoring operation on the basis of the data stored in the process data storage memory 1.

The process data storage memory 1 includes a program triggering data table 9 for triggering a program, a process flow definition table 10 for defining tracking conditions for a process to be monitored, facilities' characteristic data table 11 for defining management data for each zone, a transaction definition data table 12 for defining a form in which article management data is stored, and plant status data table 13.

The process monitoring control section 2 includes a tracking controller 21 which instructs tracking of a work (article) flowing in the line, a data manager 22 which manages the facilities' characteristic data table 11 and management data, a process status identifier 23 which determines process monitoring conditions in response of external load detection signals 41 to 51, a process input part 24 to which the detection signals 41 to 51 are input from a process to be monitored, a communication controller 25 which controls communication between the inside and outside of the process monitoring control section 25, judgement procedure executor 26 which executes a program designated by the tracking controller 21, a control program executor 27 which executes various controls on the basis of data delivered from the tracking controller 21 and the data manager 22, and a process output part 28 which outputs a process control signal designated by the control program executor 27.

To effect process monitoring of the production line shown in FIG. 2 by the process monitoring apparatus of the present invention, a process flow is first defined in the process flow definition table 10 stored in the process data storage memory 1. FIG. 4 shows one example of the structure of the process flow definition table 10. The process flow definition table 10 is, as shown in FIG. 4, composed of a process layout definition table 10a and a tracking condition definition table 10b. The process layout definition table 10a stores combination data (the arrow No., the input zone No., and the output zone No.) representing a starting zone (a facility or a tracking section) from which a work starts to flow and a destination zone to which the work flow for each of the arrows (paths through which a work flows) shown in FIG. 2. The tracking condition definition table 10b stores tracking timing, that is, conditions for transmitting article management data (transaction data) from the storage area corresponding to the input zone No. to the storage area corresponding to the output zone No., in combination of an external signal condition, judgement program No. data and control program No. data. In the column of external signal condition are set logical combinations of ON and OFF states of the load detection signals 41 to 51 (see FIG. 2) which are input from the production line, while in the column of judgement program No. are set the numbers of programs for determining the contents of transaction data and the like, and the conditions and the arrow numbers in the process layout definition table 10a which correspond to the conditions are tied together by condition pointers, respectively.

Figure 5:
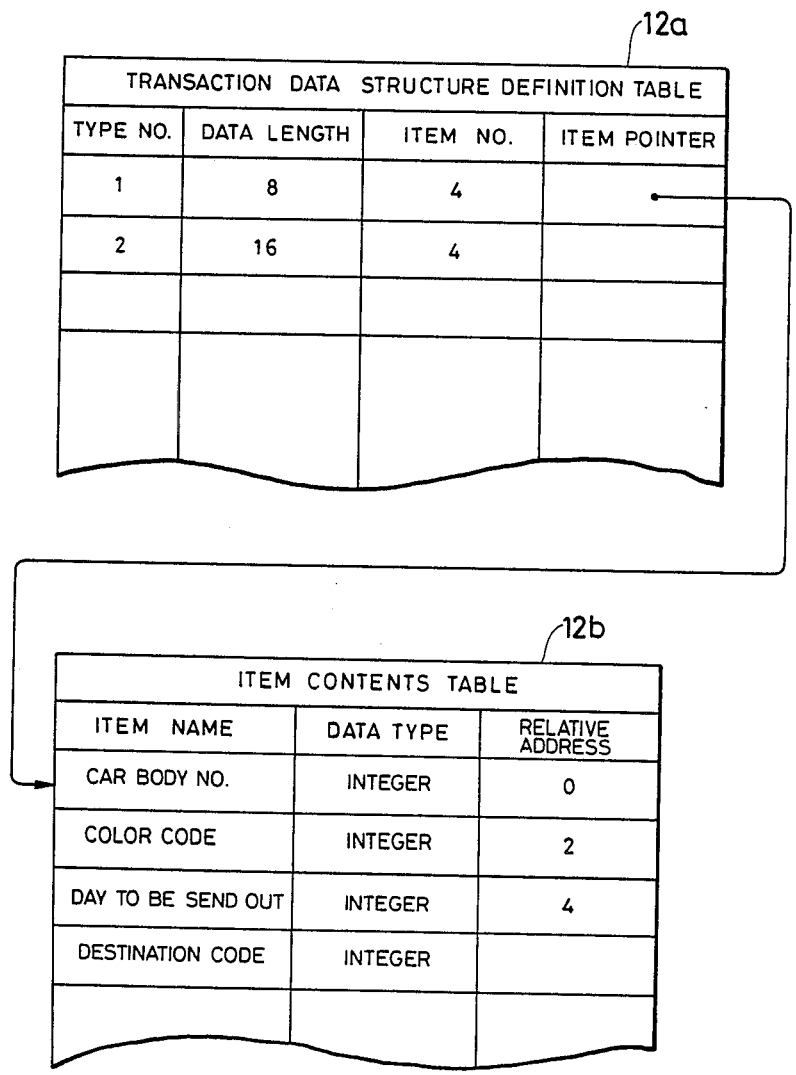
FIG. 5 shows one example of the arrangement of a table for storing transaction data structure definition table.

In the transaction definition table 12, a form in which article management data is stored is defined. FIG. 5 shows one example of the structure of the transaction definition table 12. The transaction definition table 12 is, as shown in FIG. 5, composed of a transaction data structure definition table 12a and an item contents table 12b. The transaction data structure definition table 12a stores type No., data length (the number of bites) and the number of items for each type of management data. The item contents table 12b stores specific contents of each of the items, that is, item name, and data type for each item, and each of the items is tied to the corresponding type No. in the transaction data structure definition table 12a by an item pointer. In the column of data length in the transaction data structure definition table 12a, a total of data lengths of all the items for each type is stored for each type No.

Figure 6:
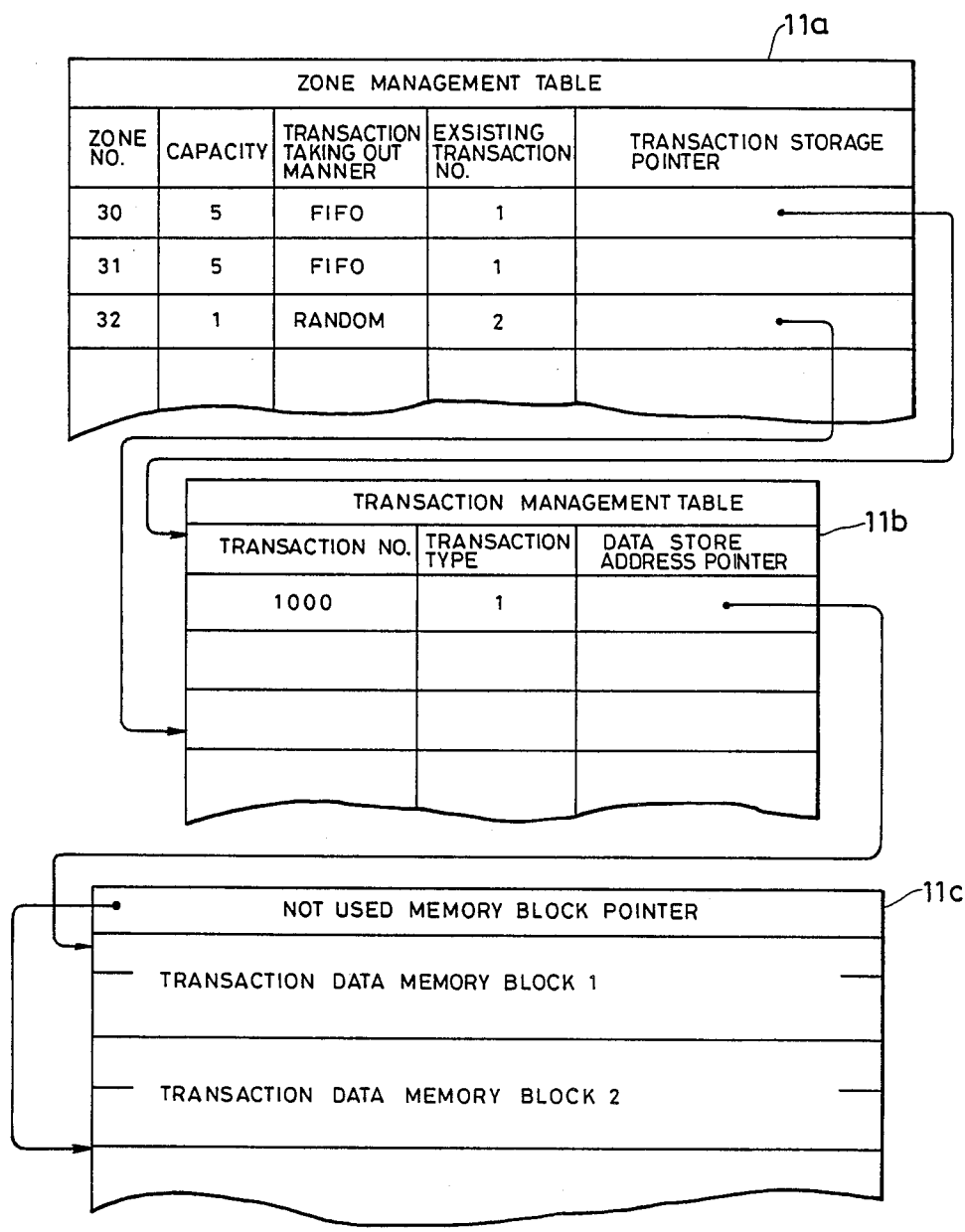
FIG. 6 shows one example of the arrangement of a table for storing facility data.

In the facilities' characteristic data table 11, management data for each zone is defined. FIG. 6 shows one example of the structure of the facilities' characteristic data table 11. The facilities's characteristic data table 11 consists of a zone management table 11a, a transaction management table 11b and a transaction data memory block 11c. The zone control table 11a stores the number of transaction data items to be managed in each zone and a transaction data taking out manner (FIFO: first-input, first-output; FILO: first-input, last-output; RANDOM: at random; etc.) for each zone No. In addition, the number of existing transactions is stored, and the table 11a is tied to the transaction management table 11b by transaction storage pointers. The transaction management table 11b stores transaction No. and transaction type and is provided with a data store address pointer to tie the table 11b and the transaction data memory block 11c. The transaction data memory block 11c stores a plurality of transaction data items and is provided with a not used memory block pointer which indicates a not used memory block.

FIG. 7 shows one example of the structure of the plant status data 13. The plant status data 13 consists of arrow No., arrow status and execution mode. FIG. 8 shows one example of the structure of the program trigger data 9. The program trigger data 9 consists of program No., program start address, the number of parameters and parameter address. The details of the structures which are respectively shown in FIGS. 7 and 8 will be explained in the description of the control operation which will be made later.

Figure 9:
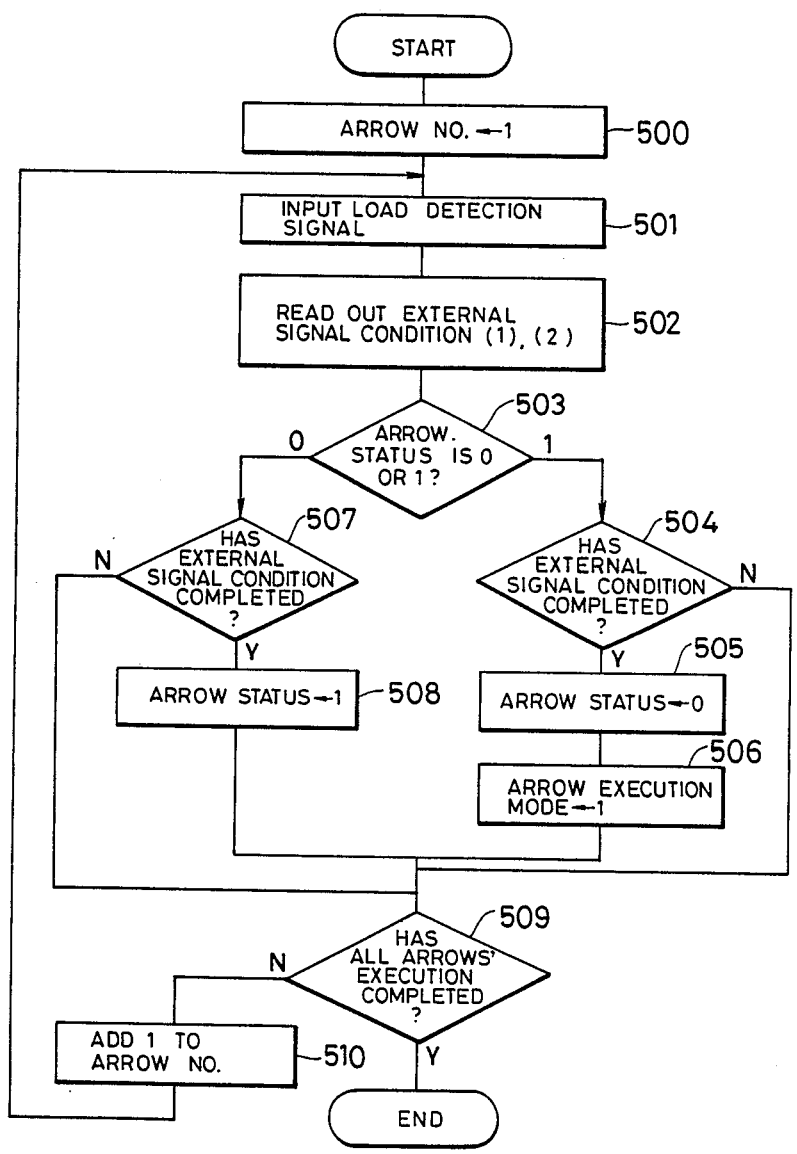
FIG. 9 is a flowchart showing the operation executed by the process status identifier shown in FIG. 1.
Figure 10:
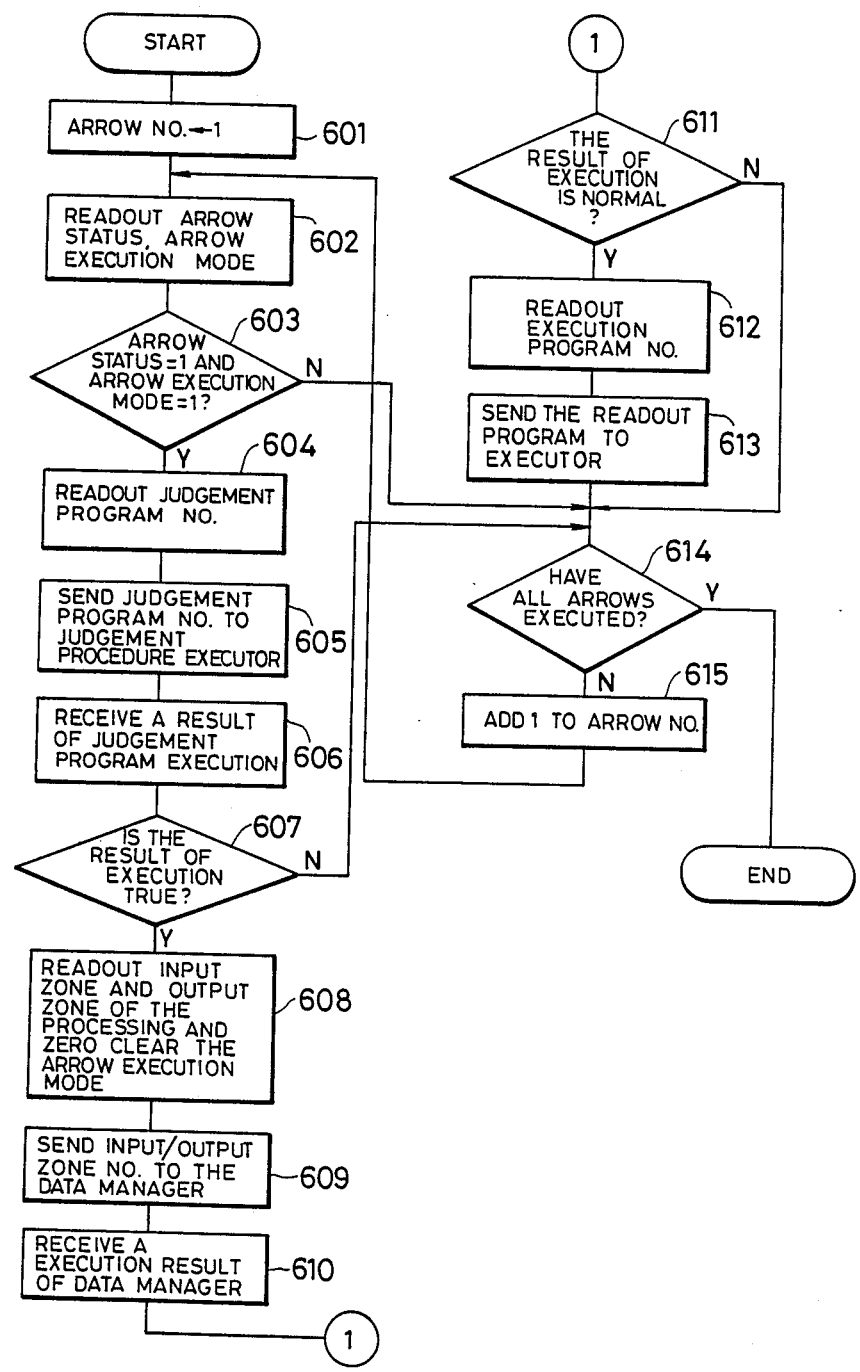
FIG. 10 is a flowchart showing the operation executed by the tracking controller shown in FIG. 1.
Figure 11:
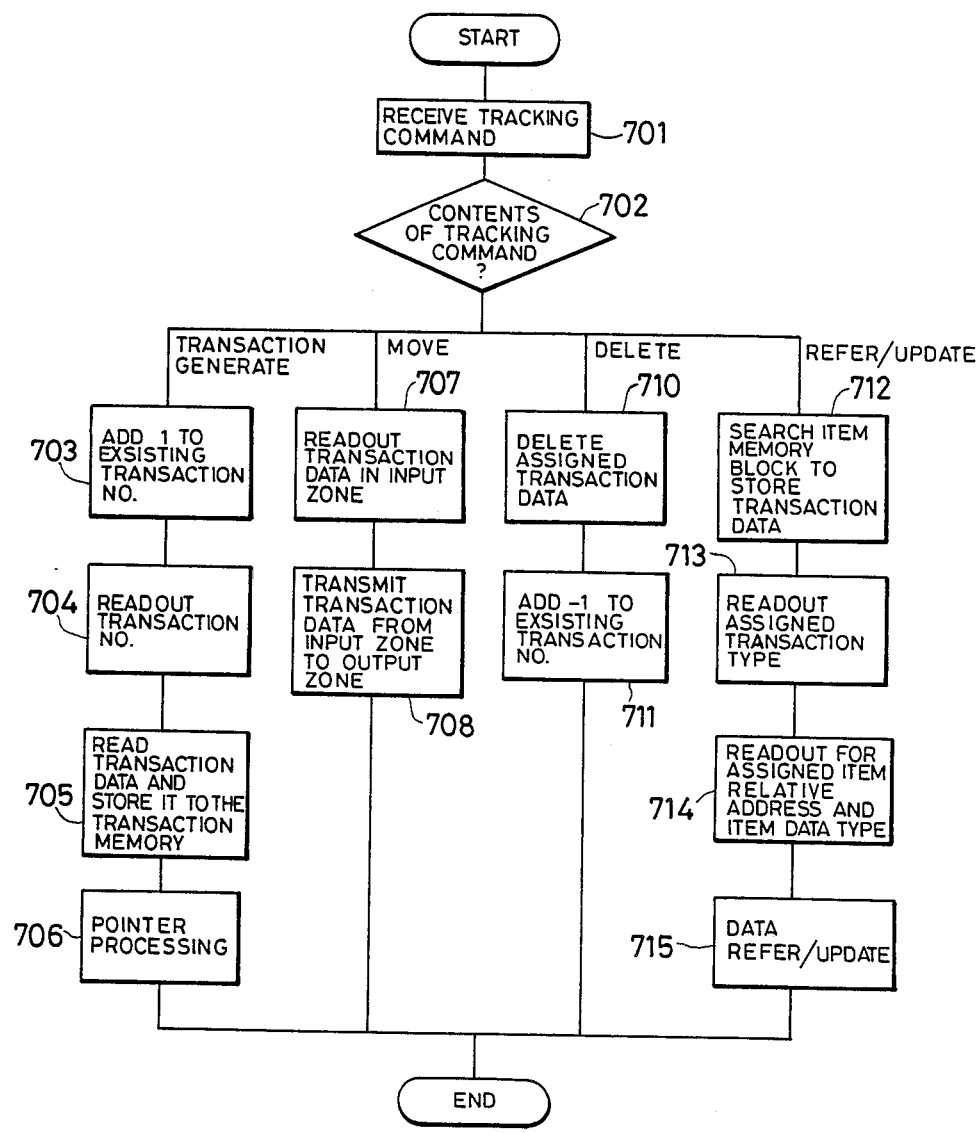
FIG. 11 is a flowchart showing the operation executed by the data manager shown in FIG. 1.

FIG. 9 is an operation flowchart showing the procedure of the operation executed by the process status identifier 23 illustrated in FIG. 1; FIG. 10 is an operation flowchart showing the operation executed by the tracking controller 21 illustrated in FIG. 1; and FIG. 11 is an operation flowchart showing the procedure of the operation executed by the data manager 22 illustrated in FIG. 1. The operation of the process monitoring control section 2 will be described below mainly about the production line shown in FIG. 2 on the basis of each of the above-described tables and with reference to the flowcharts respectively shown in FIGS. 9 to 11.

The operation of the process status identifier 23 will first be explained with reference to the flowchart shown in FIG. 9. The process status identifier 23 initializes the arrow No. to 1 (Step 500), and fetches, periodically or by a signal interruption, the load detection signals 41 to 51 (see FIG. 2) respectively output from the sensors installed in the production line through a signal line 108 via the process input part 24 to which the signals 41 to 51 are input through a signal line 109 (Step 501). Then, the process status identifier 23 reads out through a signal line 93 condition pointers with respect to all the arrow Nos. stored in the process layout definition table 10a included in the process flow definition table 10, and reads out the external signal conditions (1) and (2) from the tracking condition definition table 10b on the basis of the readout arrow Nos. (Step 502). Then, the process status identifier 23 reads out the status of the processing arrow from the plant status data table 13 (see FIG. 7) through a signal line 92 and determines the readout arrow status (Step 503). When the arrow status is "1" (i.e., the load detection signal is in an ON state), the external signal condition (2) is evaluated, and when and only when the result of evaluation is true (Step 504), "0" is set for the arrow status through a signal line 107 (Step 505), and "1" (execution wait) is set for the arrow No. execution mode (Step 506).

When the arrow status is determined to be "0" (i.e., the load detection signal is in an OFF state) in Step 503, the external signal condition (1) is evaluated, and when and only when the evaluation result is true (Step 507), "1" is set for the arrow status through the signal line 107 (Step 508).

A determination is made as to whether or not the above-described execution has been completed with respect to all the arrows (Step 509), and if NO is the answer, the arrow No. is incremented by 1 (Step 510), and the control process returns to Step 501.

The operation of the tracking controller 21 will be explained below with reference to the flowchart shown in FIG. 10. The tracking controller 21 first initially sets the arrow No. to 1 (Step 601), and reads out the arrow status and the arrow execution mode from the plant status data table 13 through a signal line 105 (Step 602). Then, a determination is made as to whether or not both the readout arrow status and execution mode are "1" (Step 603). If YES, the tracking controller 21 reads out the process flow definition table 10a corresponding to the processing arrow No., and reads out a judgement program No. to be executed from the tracking condition definition table 10b on the basis of the condition pointer in the plant layout definition table 10a within the process flow definition table 10 (Step 604). The tracking controller 21 then sends the readout judgement program No. to the judgement program executor 26 through a signal line 115 (Step 605), and receives a result of the judgement executed in the judgement program executor 26 through a signal line 116 (Step 606). The details of the judgement program executor 26 will be described later.

The tracking controller 21 which has received the judgement result reads out, only when the result is true (Step 607), the input zone No. and output zone No. of the processing arrow No. in the plant layout definition table 10a within the process flow definition table 10 through the signal line 100, and zero-clears the arrow execution mode (Step 608). Then, the tracking controller 21 sends these readout data items, together with the transaction operation command code, to the data manager 22 through a signal line 110 (Step 609), thus causing the data manager 22 to start its execution operation, and receives the result of the execution through a signal line 92 (Step 610). The details of the data manager 22 will be explained later. When the result of execution effected by the data manager 22 is normal (Step 611), the tracking controller 21 subsequently reads out a control program No. from the tracking condition definition table 10b within the process flow definition data table 10 through the signal line 100 (Step 612). Then, the readout control program No. is sent to the control program executor 27 through a signal line 95 (Step 613).

A judgement is made as to whether or not the above-described operation has been executed with respect to all the arrow Nos. (Step 614). If NO, the arrow No. is incremented by 1 (Step 615), and the control process returns to Step 602.

The details of the judgement program executor 26 and the control program executor 27 will be explained below.

The judgement program executor 26 reads out the program start address, the number of parameters and the parameter address of the judgement program concerned from the program triggering data (program execution management table) 9 (see FIG. 8) through the signal line 91 on the basis of the judgement program No. received from the tracking controller 21 and executes the control procedure. During the execution, the judgement program executor 26 refers to the contents of the plant status data 11 through a signal line 103, the data manager 22 and a signal line 117 to effect any desired operation such as checking of matching of data, and returns the result (true or false) of the operation to the tracking controller 21 through the signal line 116.

The control program executor 27 also reads out the program start address, the number of parameters and the parameter address of the execution program concerned from the program trigger data 9 (see FIG. 8) through the signal line 91 on the basis of the judgement program No., and executes the control procedure. During the execution, the control procedure executor 27 refers to and updates the contents of the facilities' characteristic data table 11 through the signal lines 103, 104, the data manager 22 and signal lines 96, 97 and effects any desired communication processing through the communication controller 25 and signal lines 99, 119 and any desired signal output processing through the process output part 28 and a signal line 98. The communication controller 25 controls communication with the outside through signal lines 113 and 114, while the process output part 28 outputs the processed process control signal to the outside through a signal line 94.

Figures 12, 13:
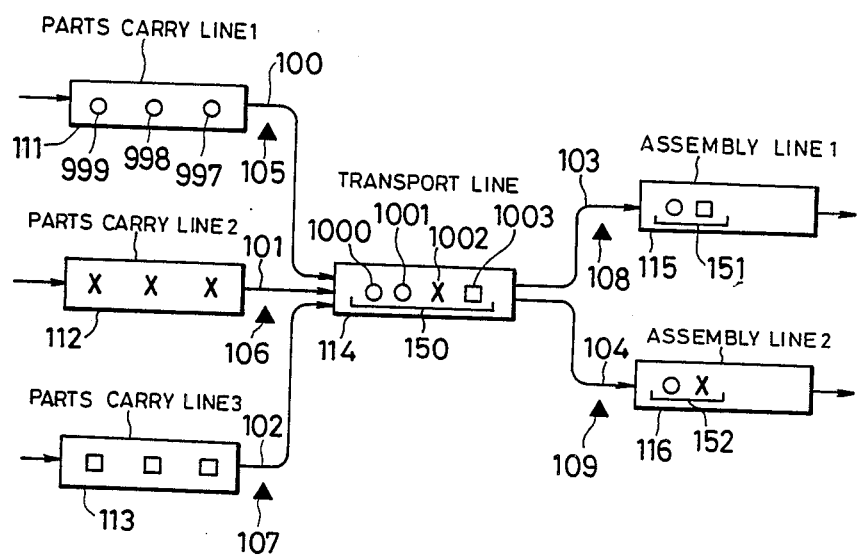
FIG. 12 shows the arrangement of the tracking command data.
FIG. 13 shows another example of the arrangement of a production line.

FIG. 12 shows the arrangement of the tracking command output from the tracking controller 21. The tracking command consists of a command code, the input zone No., the output zone No. and parameters (transaction No.). In this case, the command code is represented by numerals such as "01", "02", "03" and "04". The code "01" instructs generation of transaction data; the code "02" instructs movement of transaction data; the "03" instructs deletion of transaction data; and the code "04" instructs reference/updating of transaction data.

The operation of the data manager 22 will be explained below with reference to the flowchart shown in FIG. 11. The data manager 22 first receives a tracking command (a command code, input and output zone Nos. and parameters) as shown in FIG. 12 (Step 701), and analyzes the command code on the basis of the received tracking command (Step 702), and then effects transaction processing operations such as generation, movement, deletion and reference/updating of transaction data through the signal lines 103 and 104. The data manager 22 further carries out any desired communication processing between the same and the communication controller 25 through the signal lines 111 and 112.

Finally, the contents of these transaction processing operations will practically be explained below.

In the transaction generating operation, the existing transaction No. of the assigned output zone No. in the zone management table 11a (see FIG. 6) within the facilities' characteristic data table 11 is incremented by 1 (Step 703), and the assigned transaction No. is written in a transaction No. area in the transaction management table 11b which is indicated by the transaction storage pointer (Step 704) In addition, the contents of the generated transaction read out through the communication controller 25 and the signal line 111 is stored in a transaction data memory block indicated by the not used memory block pointer (Step 705), and this memory block is tied to the written transaction No. by the data store address pointer in the transaction management table 11b (Step 706).

In the transaction moving operation, the respective values of the corresponding transaction No., type and data store address pointer are read out from the area in the transaction management table 11b which is indicated by the transaction storage pointer in the zone management table 11a through the signal line 103 in accordance with the transaction taking out manner (FIFO or the like) of the assigned input zone No. (e.g., 30) in the zone management table 11a within the facilities' characteristic data table 11 (Step 707), and these data items are moved to respective memory blocks in the transaction management table 11b indicated by the transaction storage pointer of the assigned output zone (e.g., 32) (Step 708).

In the transaction deleting operation, the assigned transaction No. is deleted from the memory block in the transaction management table 11b indicated by the transaction storage pointer of the assigned zone No. in the zone management table 11a within the facilities' characteristic data table 11 (Step 710), and −1 is added to the number of existing transactions of the assigned zone No. in the zone management table 11a (Step 711).

In the transaction reference/updating processing operation, the assigned transaction No. is searched from the transaction No. memory block in the transaction management table 11b on the basis of the transaction storage pointer of the assigned zone No. in the zone management table 11a within the facilities' characteristic data table 11, and the transaction data memory block indicated by the data store address pointer of the found item memory block is searched (Step 712). Subsequently, the assigned transaction type is read out from the assigned transaction management table 11b (Step 713), and the assigned item relation address and item data type are read out through the signal line 106 on the basis of the item pointer of the same type No. in the transaction data structure definition table 12a (see FIG. 5) within the transaction definition table 12 (Step 714).

On the basis of the readout data, any desired data in the transaction data memory block which has been found in advance is referred to or updated (Step 715).

There has been described thus far the operation of each of the functional blocks (see FIG. 1) within the process monitoring control section 2. Through the above-described operations, the process monitoring control section 2 tracks works flowing through the production line and effects tracking of the work management data (transaction data) in accordance with the movement of the works.

Thus, in this embodiment, the installation layout of a production line which is an object of the monitoring, the transaction data arrangement, the tracking conditions, etc. are separated from each other in the form of data stored in the individual tables 9, 10, 11 and 12 within the process data storage memory 1, and analysis and execution of commands are effected by the process monitoring control section 2. Therefore, preparation and modification of the program can be made simply by correcting the data in these tables, which means that the program preparing and changing operations are easily facilitated. Accordingly, a clear advantage of this is that the time required for preparation and maintenance of process monitoring software can be reduced significantly.

It should be noted that, as a modification of this embodiment, the plant layout definition table 10a and the tracking condition definition table 10b, which are shown in FIG. 4, may be arranged as one table rather than tied together by pointers. The judgement program executor 26 and the control program executor 27, which are shown in FIG. 1, may be arranged as one function block. Although in this embodiment the execution of judgement programs is periodically performed with respect to all the works, it is not necessarily limited to it, and a specific judgement program alone may be executed. In this embodiment, further, data which defines the layout of facilities constituting a production line which is an object of the process monitoring and the characteristics of the facilities, and data which defines the contents of article management data are separated from the mechanism which processes these data items as the article moves, and are managed as table data. It is therefore possible to speedily and readily realize a process monitoring system for a production line which involves a complicated layout and a multitude of different kinds of articles including the preparation, correction, modification and the like of software.

The following is a description of an arrangement which takes into account a tracking mechanism such as the generation of a lot as a result of joining of a plurality of works carried out in the course of movement of the works along the assembly line, tracking of the generated lot, or the lot divide operation in which the joined work group is divided into a plurality of sub-lots. A second embodiment of the present invention will be described below with reference to FIGS. 13 to 22. An assembly line shown in FIG. 13 is employed as an object of a process monitoring operation.

In FIG. 13, boxes 111 to 116 represent unit sections (tracking zones) in which lots (groups of articles which are identified by key codes) flow in the assembly line, an arrows 100 to 104 represent paths along which the lots move between the tracking zones. In addition, black triangular marks 105 to 109 annexed to the arrows represent sensors for detecting the movement of lots.

The boxes 111, 112 and 113 correspond to parts carry lines, respectively, in practice. Parts of each individual kind (represented ○ , × and □ in FIG. 1) are cast on each of the parts carry lines. The parts cast on the parts carry lines are then cast on as transport line 114 as one joined lot 150 consisting of a total four parts, that is, two ○ parts, one × part and one □ part. The transported joined lot 150 is divided into a divided lot 151 consisting of part ○ and one △ part and a divided lot 152 consisting of and one ○ part and one × part, these divided lots being cast on assembly lines 1 (115) and 2 (116), respectively.

The following is a description of a procedure for tracking a lot group (the lot arrangement changing in accordance with the lot divide and join operations) flowing in, for example, the main line.

Figure 14:
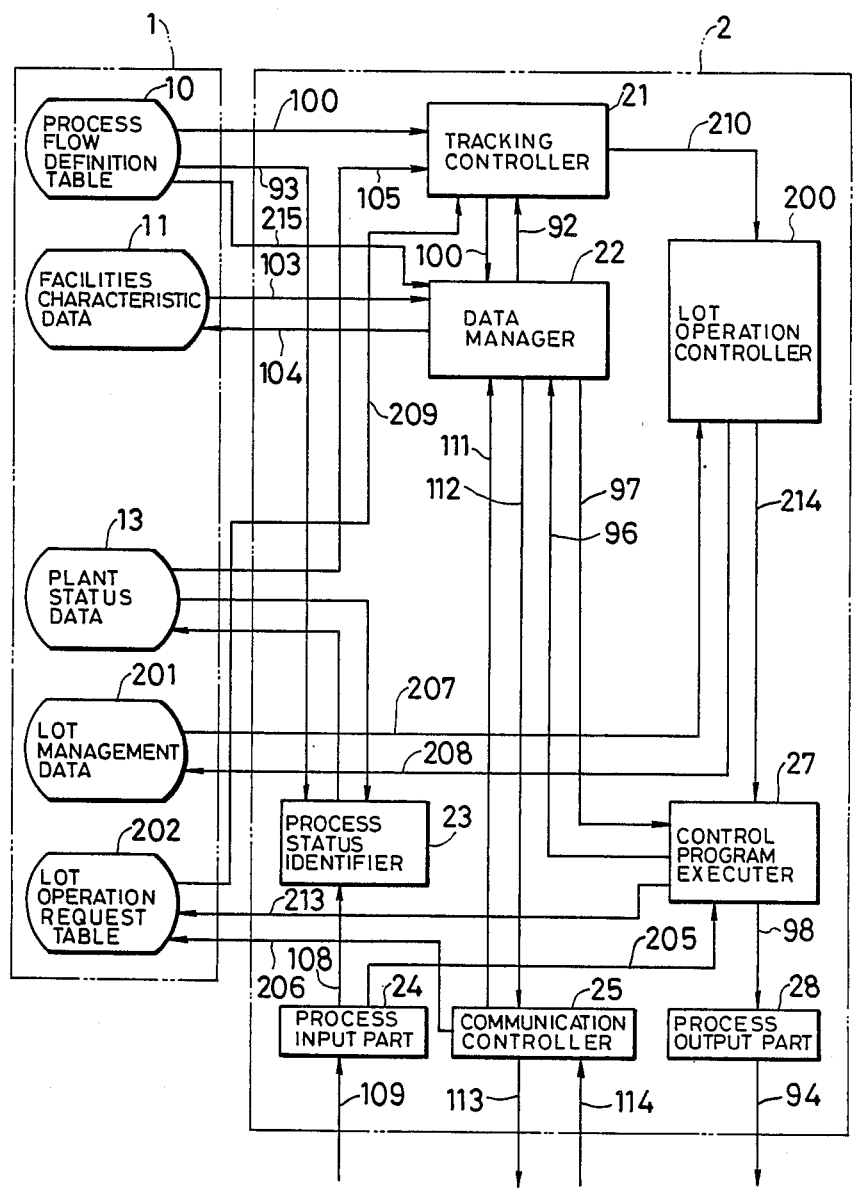
FIG. 14 shows the arrangement of a second embodiment of the process monitoring apparatus according to the present invention.
Figures 16, 17:
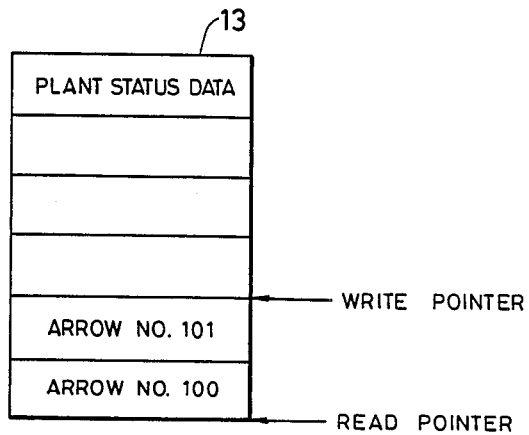
FIG. 16 shows the arrangement of a table for storing plant status data.
FIG. 17 shows the arrangement of a table for storing lot operation request shown in FIG. 14.
Figure 18:
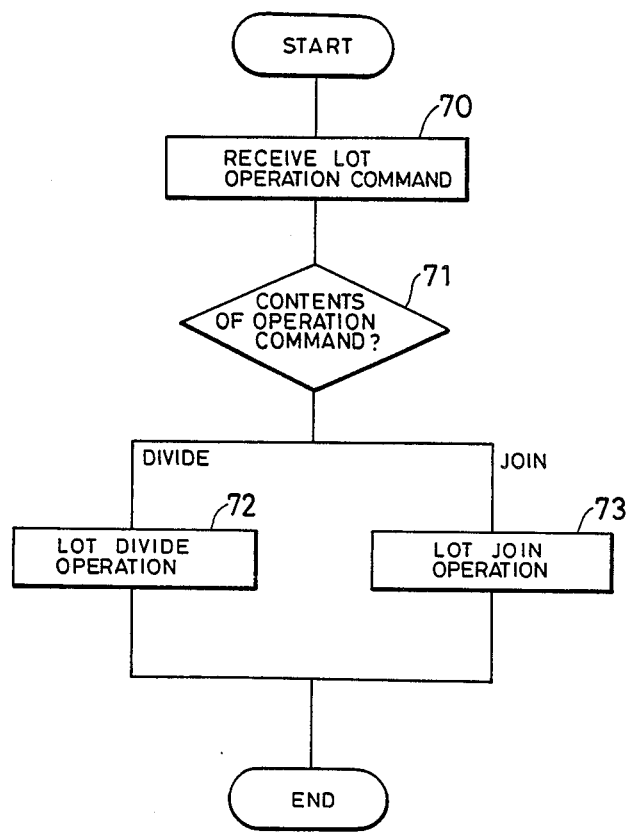
FIG. 18 is a flowchart showing the procedure of operation executed by the lot operation controller.
Figure 19:
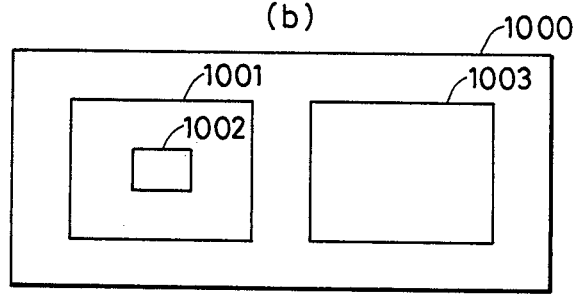
FIG. 19(a) shows the arrangement of a table for storing lot management data.
FIG. 19(b) shows one example of the arrangement of lot.
FIG. 19(c) shows pointers related to the lot management data shown in FIG. 19(a)
Figure 19:
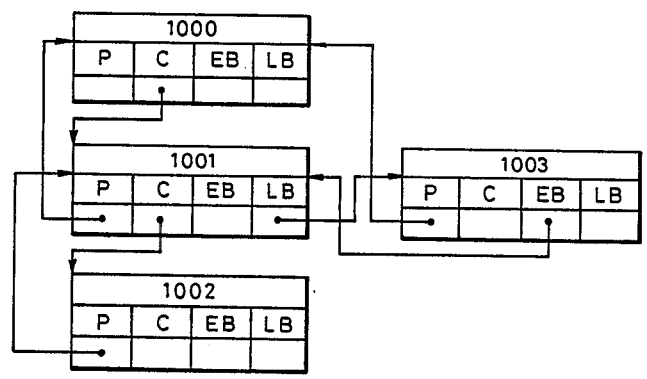

FIG. 14 shows the arrangement of the second embodiment of the process monitoring apparatus according to the present invention. This apparatus consists basically of a process data storage memory 1 and a process monitoring control unit 2. To monitor the assembly line shown in FIG. 13 by this apparatus, a process flow definition table 10 in the process data storage memory 1 is first defined. The process flow definition data table 10 consists of a plant layout difinition table 10a and a tracking condition definition table 10b which are shown in FIG. 15. The plant layout definition table 10a stores combination data [arrow No., input zone No. and output zone No.] which represent a starting tracking zone from which a work starts to flow and a destination tracking zone to which the work flows for each of the arrows (paths along which works flow) shown in FIG. 13. The tracking condition definition table 10b stores logical combinations of ON and OFF states of load detection signals (respectively delivered from the sensors represented by the triangular marks 105 to 109 in FIG. 13) input to the process monitoring control section 2 from the assembly line, the logical combinations designating tracking timing, that is, conditions for transmitting management data (transaction data) for each lot from a memory block corresponding to the input zone No. to a memory block corresponding to the output zone No. Tables (13, 201 and 202) which are not mentioned in the description above will be explained below together with the operation of the process monitoring control section 2.

The operation of a lot operation controller 200 will be described below in detail while explaining the basic operation of the process monitoring control section 2. The process status identifier 23 fetches, periodically or by a signal interruption, ON/OFF values of the above-described load detection signals from the sensors installed along the assembly line, through a process input part 24 (see the arrows 108 and 109). Then, with respect to all the arrow Nos. stored in the plant layout definition table 10a within the process flow definition table 10, condition pointers are read out, and on the basis of these readout condition pointers, external signal conditions (1) and (2) are read out from the tracking condition definition table 10b. When and only when the state of each of the input load detection signals changes from a condition designated by the external signal condition (1) to a condition designated by the external signal condition (2), an arrow No. corresponding to the tracking condition concerned is stacked in the plant status data table 13 (FiFo stack) shown in FIG. 16.

The tracking controller 21 periodically scans the plant status data table 13, and when one or more arrow Nos. are stacked in the table 13, the controller 21 successively reads out the arrow Nos. (see the arrow 105), and reads out, on the basis of the read-out arrow No., a lot operation request in the arrow No. concerned set in a lot operation request table 202 shown in FIG. 17 (see the arrow 209). In the lot operation request table 202 are set the contents of lot operations (join, divide and move operations) which are to be conducted when tracking conditions are established for each arrow. When the lot operator is "join", an operation lot No. (1) which is an object of the lot join operation and an operation lot No. (2) to which a particular operation lot No. (1) is joined are further set. When the lot operator is "divide", an operation lot No. which is to be divided is set (when the lot operator is "move", no designation is needed with respect to operation lot Nos. (1) and (2)).

A plurality of lot operators can be set in parallel for each arrow. For example, at an arrow 103 in the assembly line shown in FIG. 13, a part 1000 represented by ○ and a part 1003 represented by □ are divided from a lot 150 and joined together again as a lot 151. When this operation is set in the lot operation request table 202, four lot divide and join operations are set in order of execution as shown in the area of the arrow No. 103 in FIG. 17.

The above-described contents of the lot operation request table 202 are set from, for example, an operation terminal at the site through the communication controller 24 shown in FIG. 14 before the lot operation controller 200 (described later) is activated.

The tracking controller 21 reads out the contents of a lot operation from the lot operation request table 202 (see the arrow 209), and when the lot operator is "join" or "divide", the controller 21 sends the readout lot operator to the lot operation controller 200 (see the arrow 210) to activate the controller 200. When the lot operator is "move", the tracking controller 21 sends the lot operator, together with the arrow No., to the data manager 22 to activate the manager 22 (see the arrow 100). The operation of the data manager 22 will be explained later, and the operation of the lot operation controller 200 will first be described below with reference to the flowchart shown in FIG. 18.

The lot operation controller 200 receives a lot operation command from the tracking controller 21 (Block 70) and makes a determination of the contents of the operation command (Block 71). When the contents of the operation command represent "divide", the controller 200 effects an operation of dividing a transaction (lot tracking data) corresponding to division of the lot (this dividing operation will hereinafter be referred to simply as "lot divide operation") (Block 72), whereas, when the contents of the operation command represent "join", the controller 200 effects an operation of joining of a transaction corresponding to the joining of the lot (this joining operation will hereinafter be referred to simply as "lot join operation") (Block 73).

To make a description of the contents of the lot divide and join operations, the contents of the lot management data table 201 for managing the relationship between lots which are joined together will first be explained. The lot management data table 201 stores the arrangement of each of the whole lots being cast on the assembly line in the form of a combination of a parent lot No. (P) in which the lot is included, a child lot No. (C) included in the lot and an elder brother lot No. (EB) and a little brother lot No. (LB) which are simultaneously included in the same parent lot as that including the lot concerned.

For instance, in the case where, a lot 1000 includes lots 1001 and 1003, and the lot 1001 further includes a lot 1002 as shown in FIG. 19(b), the contents of the lot management data are set as shown in FIG. 19(a). More specifically, with respect to the lot No. 1000, one representative lot (e.g., the lot 1001) of the lots 1001 and 1003 included in the lot 1000 is registered as a child lot, and the other simultaneously joined lot 1003 is registered as a little brother lot of the lot 1001 first registered as a child lot. In the lot 1003 registered as a little brother lot, the lot No. of the lot 1001 in which the lot 1003 is registered as a little brother lot thereof is registered as an elder brother lot. In the lot 1001 registered as a child lot of the lot 1000 and the lot 1003 registered as a little brother lot of the lot 1001, the lot 1000 which includes these lots is registered as a parent lot. Since the lot 1001 further includes a lot 1002, the lot 1002 is registered as a child lot of the lot 1001, and the lot 1001 is registered as a parent lot of the lot 1002. The contents of the above-described lot management data 201 may be shown as those illustrated in FIG. 19(c) in which the relationship between the lots is shown using pointers.

Figure 20:
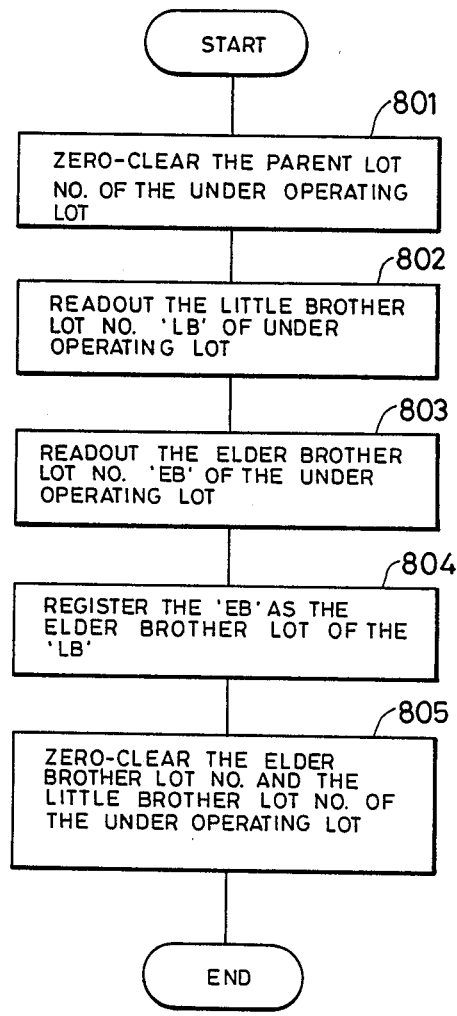
FIG. 20 shows a flowchart showing the lot divide operation procedure.
Figure 21:
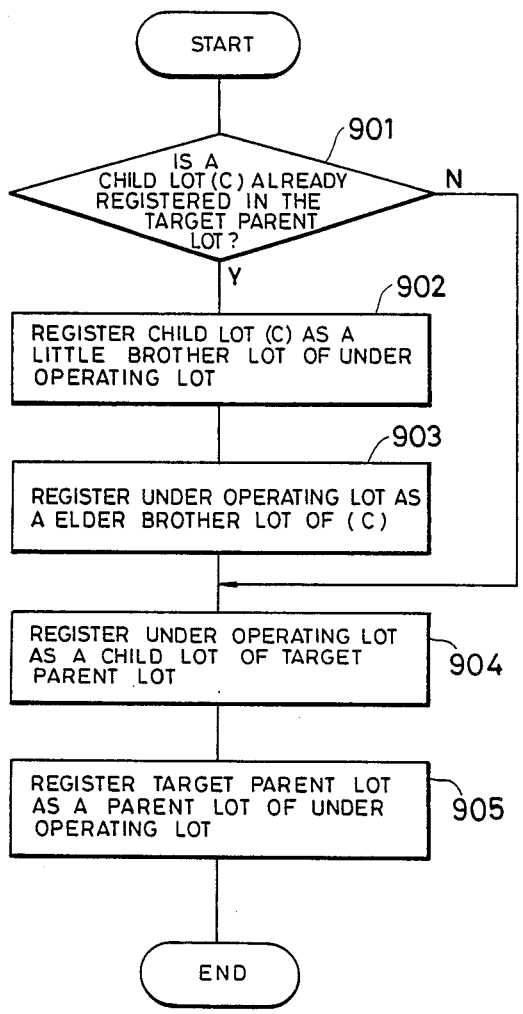
FIG. 21 is a flowchart showing the lot join operation procedure.
Figure 22:
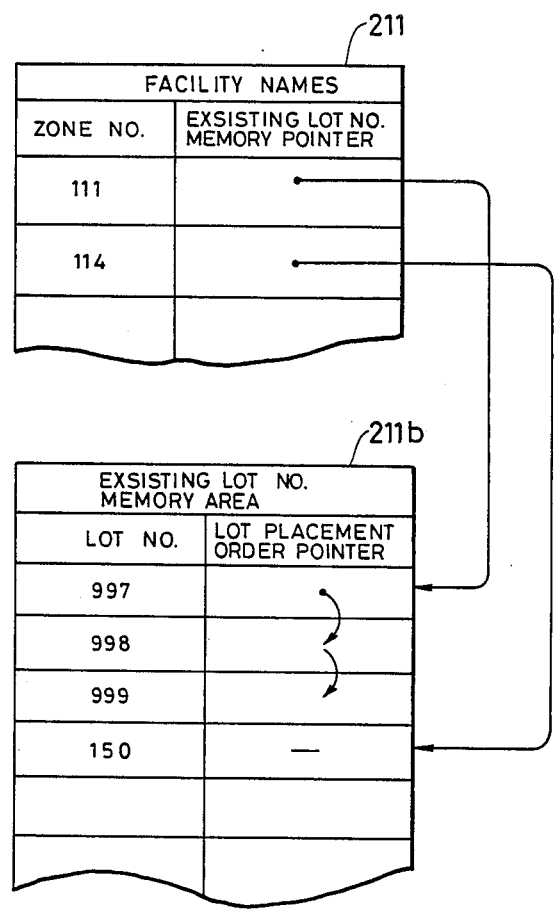
FIG. 22 shows the relationship between facility data and storage area therefor.

The lot operation controller 200 conducts the lot divide and join operations by using the above-described lot management data 201 as follows. In the lot divide operation, as shown in FIG. 20, the registration of the parent lot (P) of the under operating lot No. is first zero-cleared (Block 801), thereby invalidating the relationship of the under operating lot with its parent lot. Then, the little brother lot (LB) and the elder brother lot No. (EB) of the under operating lot are read out (Blocks 802 and 803), and the lot (EB) is registered as an elder brother lot of the readout lot (LB) (Block 804). Finally, the registration of the elder brother lot (EB) and the little brother lot (LB) of the under operating lot are zero-cleared (Block 805). In this way, the under operating lot is divided. In the lot join operation, as shown in FIG. 21, a judgement is first made as to whether or not a child lot (C) has already been registered in the target parent lot (Block 901), and if YES, the child lot (C) is registered as a little brother lot (LB) of the under operating lot (Block 902), and the under operating lot is registered as an elder brother lot (EB) of the lot (C) (Block 903). The under operating lot is registered as a new child lot (C) of the target parent lot (Block 904), and the target parent lot is registered as a parent lot (P) of the under operating lot (Block 905). If no child lot (C) has already been registered in the target parent lot in Block 901, only Blocks 904 and 905 are executed. Thus, the lot join operation is effected.

After carrying out the above-described lot operation, the lot operation controller 200 reads out the execution start address of a control procedure program for an assembly line to be executed after the lot operation from the tracking condition ( definition table (10b) and transmits the readout address to the control program executor 27 to start the control procedure program (see the arrow 214 in FIG. 14). According to the control procedure program, control outputs are delivered to the process through the process output part 28.

Finally, the operation of the data manager 22 will be explained. The data manager 22 receives a "move" command and the arrow No. from the tracking controller 21 and reads out the input zone No. and the output zone No. of the corresponding arrow from the plant layout definition table 10a included in the process flow definition table 10. On the basis of the readout data, the data manager 22 takes out a lot No. from a facilities' characteristic data table 211 shown in FIG. 22, the lot being the one which has been first cast among the lots existing in the existing lot No. memory storage of the input zone, and writes the readout lot No. in the existing lot No. memory storage 211-b of the output zone. The existing lot No. memory storage 211-b stores lots successively cast on the zone in that order and thereby realizes an FIFO stack. After carrying out the above-described operations, the data manager 22 reads out the execution start address of a control procedure program to be executed on the basis of the corresponding arrow No. from the tracking condition definition table 10b within the process flow definition table 10 (see the arrow 215 in FIG. 14) and transmits the readout address to the control program executor 27 to start the control procedure (see the arrow 97). The above is the operation of the data manager 22.

According to this embodiment, in tracking of a lot moving in the assembly line while being divided and joined in accordance with the layout of the assembly line stored in the process data storage memory 1, the arrangement of a joined lot (a parent-child relationship) is separated into pointer data items in the lot management table. Therefore, it is not necessary to provide a data file for each individual lot arrangement, and it is possible to manage and grasp any desired change in the lot arrangement simply by effecting a pointer operation, so that the preparation and modification of the tracking procedure program are extremly facilitated.

Although in this embodiment the contents of the lot operation command table 102 are set from the outside through the communication controller 25, they may be set in a control procedure program (internal program) which is started by the lot operation controller 200 (see the arrow 213 in FIG. 14).

As has been described above, it is possible, according to the present invention, to carry out a process monitoring operation which is suitable for collection of management data, management and monitoring of operations in tracking of articles (works) in an automated production line and which facilitates programming and exhibits great flexibility.

Even in the case where, in tracking of a work group flowing through the production/assembly line, the lot arrangement temporally changes because a plurality of works are joined together into one lot in the course of flowing along the line or one lot is divided into a plurality of sub-lots, it is possible, according to the present invention, to realize a function for automatically managing a group of works or sub-lots contained in each lot and tracking these works or sub-lots. Thus, it is possible to greatly reduce the steps for developing a process monitoring system for which software has heretofore been developed for each object, and also cope with flexibly a change in the lot operation in accordance with a change in the process or a change in the layout.

What is claimed is:

1. A process monitoring apparatus adapted to track movement of a plurality of works existing in a plurality of facilities in a process based on a condition of work movement detection signal, comprising:
   first memory means for holding facility characteristic data for each one of said plurality of facilities and which together with the works constitute a production line in said process, said facility characteristic data defining a manner for storing the works in each facility;
   second memory means for holding tracking conditions representing a detection of movement flow of works between facilities;
   third, fourth and fifth memory means, said third memory means holding management data for managing update operation of process status data in said fifth memory means, said fourth memory means holding program triggering data for triggering a program which defines contents of an operation represented by said management data concerning said works and said fifth memory means holding process status data including said movement detection signal which indicates the movement of said works in said production line and the number of said works being stored in each facility;
   means for extracting management data in said third memory means and means for determining which of said tracking conditions have been completed in response to the contents retrieved from said second and fifth memory means; and
   processing means for executing a process corresponding to the contents of said first, second and fourth memory means with respect to the extracted management data.

2. A process monitoring apparatus according to claim 1, wherein said first memory means for holding facility characteristic data including means for storing data concerning the capacity in each facility in relation to the works and the manner of removing works from a facility.

3. A process monitoring apparatus according to claim 1, wherein said second memory means including:
   process layout definition information holding means for storing data representing a combination of an input zone in which a work is to be moved from and an output zone in which said work is to be moved to in relation to a particular flow path between zones.

4. A process monitoring apparatus according to claim 1, wherein said third memory means including:
   transaction data structure definition means for storing type number, data length and number of items for each type of said management data; and
   item contents means for storing specific contents of each type of work, work item name, corresponding data for each work item, and relating each of the work items to a corresponding type number stored in said transaction data structure definition means.

5. A process monitoring apparatus according to claim 1, wherein said program trigger data of said fourth memory means includes a program number, a start address for each program, number of parameters and the corresponding parameter address of each execution program.

6. A process of monitoring apparatus according to claim 1, wherein said process status data of said fifth memory means includes information corresponding to individual paths among zones wherein works flow between said zones and information indicating status of said paths with respect to execution of work flow.

7. A process monitoring apparatus according to claim 1, wherein said work movement detection signal is detected by sensors positioned at all paths among zones for sensing movement of said works between zones.

* * * * *